Jan. 17, 1939.  O. SHEPPARD, JR  2,144,579
METHOD OF DELINTING COTTONSEED
Original Filed Nov. 24, 1936
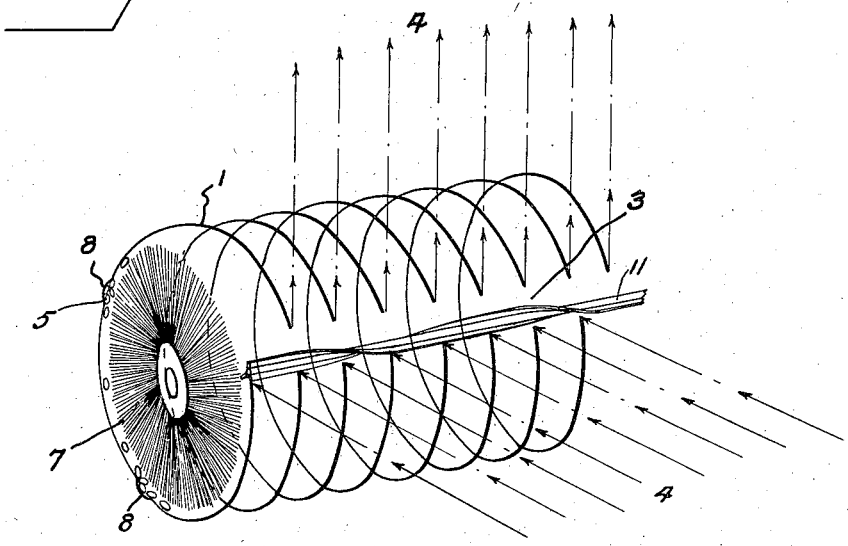
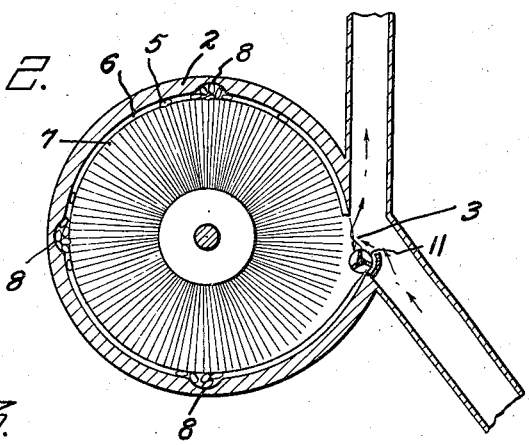
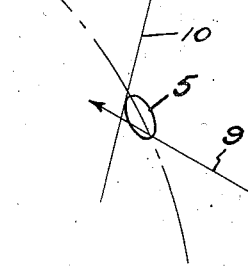
Inventor
Orlando Sheppard, Jr.
By Mason Fenwick & Lawrence
Attorneys Patented Jan. 17, 1939

2,144,579

UNITED STATES PATENT OFFICE 2,144,579

METHOD OF DELINTING COTTONSEED

Orlando Sheppard, Jr., Atlanta, Ga.

Original application November 24, 1936, Serial No. 112,575. Divided and this application September 9, 1937, Serial No. 163,121

4 Claims. (Cl. 19—44)

This invention relates to the method of delinting cotton seeds, and this application is a division of my co-pending application Serial No. 112,575, filed November 24, 1936, now Patent No. 2,095,155, granted October 5, 1937.

One of the objects of the invention is to provide a method of delinting which is an improvement over present known methods, in expediting the delinting, minimizing the power required, avoiding damage to the shell or capsule of the seed, and improving the quality of the lint through the absence of "pepper" in the lint.

Another object of the invention is the provision of a method of delinting cotton seeds characterized by the feature that no recourse is made to the use of saws.

Other objects of the invention will appear as the following description of the method proceeds.

In the drawing which diagrammatically illustrates the steps of the method;

Figure 1 indicates seed travelling in a spirally circuitous path being subjected to attrition, and periodically to an air current as they recurrently enter the zone of air application while travelling through the helices of the spiral;

Figure 2 is a view taken in a plane at right angles to the axis of the spiral shown in Figure 1 illustrating seed in transit through the spiral path, seed in vorticular moving groups and seed in free trajectory being blown upon by an air current in two directions; and Figure 3 is a diagrammatic view of a single seed illustrating the effect of the direction change of the air current in the region of free trajectory of the seed.

Before entering into a detailed description of the method of the present invention, it may be stated that the customary method of delinting cotton seed is to bring the seed in bulk in a seed box or hopper into contact with a gang of saws projecting through narrow slots. The teeth of the saws engage the lint and drag it away from the seed through the slots in the seed box which are too narrow to permit the seed to pass through. In order to obtain effective delinting, the seed must remain in the immediate region of the peripheries of the saws. Continued engagement of the teeth of the saws against the surface of the seed damages the seed and since the saws are rigid, the teeth pick away small specks of the seed capsule which mix with the lint and being of dark color, are known as "pepper". The product of all saw-type delinters is characterized by the presence of this "pepper" and it seriously depreciates the value of the lint for the lint cannot be used for various purposes such for example, as the making of cellulose nitrate or acetate without putting it through an expensive process for removing the "pepper".

The saw-type method of delinting is further characterized by the fact that it is extremely slow since only a small proportion of the entire body of seed can at any time be brought into contact with the saw blades, and an excessive amount of power is required in the delinting. Since the capsules of the seed are damaged by the saw teeth, a large percentage of the delinted seed are unfit for planting purposes.

The present invention comprises moving the seed through a spiral path which path at each convolution intersects the path of flow of an air current. The spiral path is indicated at 1 in Figure 1, and is tangibly represented as a spiral groove in a surrounding casing 2, Figure 2. The longitudinal discontinuous portion 3 of the spiral represents the region where the helices of the spiral path intersect the path of an air current. In Figure 1 the air current which is represented by the arrows 4 undergoes a direction change in the region where it is intersected by the helices of the spiral path. The seed indicated by the reference character 5 are swept around the groove 6 in the surrounding casing 2 by a brush 7. In the course of their travel within the spiral grooves of the casing 2 they are subject to rubbing against the walls of said grooves and to the scouring imparted by the ends of the filaments of the brush 7. The spiral grooves are also provided with pits 8 of sufficient depth to permit the collection of a small plurality of seed, which under the action of the brush are set into a vorticular whirl in which the seed rub against one another.

Throughout their traverse of the spiral grooves and in the pits 8, the seed are in association with the loosened lint resulting from the several attritive operations. This loose lint also acts as a detergent agent and as a cushion as well, preventing damage to the capsule of the seed through rubbing contact with the hard surface of the apparatus.

The speed of rotation of the brush, and consequently the rate of travel of the seed is fast enough to engender an appreciable centrifugal force. When in each helix of the spiral path the seeds reach the region where said helices intersect the air current 4, the seed are thrown centrifugally in a free trajectory into said air current. They are caught by means of a conveyor 11 which lies in the path of said trajectory. while in said trajectory, the seed are subjected to the impingement of said air current in two different directions as indicated at 9 and 10. Thus the lint loosened from the seed is blown away by the double action of the air current. The conveyor moves the seed to an advanced helix of the spiral path and rotates in a direction to return the seed to the closed spiral path bounded by the surface of the brush and the walls of the grooves 6 where they are again subjected to the attritive action of the seed against the walls of the grooves, the brush against the seed and the seed against one another in the pits 8.

The seed are subject to repetitive lint loosening action in the many successive helices of the spiral path 1 and between each return of the seed to said spiral path they are subjected to the blast of the air current for the removal of the loose lint. The delinting action is thus very thorough and extremely rapid and for a given power a much larger quantity of seed can be delinted than in any apparatus of the saw type. Various degrees of delinting are desirable for different purposes. For example, in mixing seed hulls with seed meal for cattle feed, it is preferred that a certain amount of lint be left on the seed so that the hulls will be acceptable to the cattle in the compressed mass. In preparing the seed for the oil press and in delinting the seed for planting it is highly desirable that the seed be completely denuded. Saw-type machines are incapable of removing all the lint without damaging the capsule of the seed.

Since in the practice of the present method seed enter at one end of the spiral, it is possible to discharge them at an intermediate point and thus secure seed which are partly delinted or to discharge them at the far end of the spiral and obtain completely delinted seed. Inasmuch as the method is characterized by the absence of saws or other sharp instruments which will pick into the surface of the seed capsule, the lint resulting from the present process is uniformly clean and free from "pepper", bringing a higher price in the market than lint which has been produced by saw machines, since no additional process must be employed for removing the "pepper".

While I have in the above disclosure described what I believe to be a preferred and practical method for delinting cotton seed, it will be understood to those skilled in the art that the invention as claimed is of sufficient breadth to permit variations in the technique or in the order which certain of the method steps may be performed without transcending the scope of the protection conferred by the patent.

What I claim is:

1. Method of delinting cotton seeds comprising providing in a region intermediate the induction and eduction ends of a moving air column, an abrupt direction change in said air column, moving raw cotton seed repetitively through a succession of circuitous closed paths extending transversely of the direction of air flow and communicating with said air column in the region of said direction change, subjecting said seeds to abrasive action while within said closed paths for loosening lint, throwing said seed, in the course of each circuit, freely through a path which carries them into and out of the salient portion of said air column at said region of direction change for removing and carrying off loosened lint, and returning said seed to said circuitous paths for further abrasive treatment alternating with further air treatment.

2. Method of delinting cotton seeds comprising moving raw cotton seed repetitively through a succession of circuitous closed paths extending transversely of the direction of a flowing air column and communicating therewith, subjecting said seed to abrasive action while within said closed paths for loosening lint, throwing them freely, in the course of each circuit, through a path which carries them into and out of the salient portion of said air column for removing and carrying off loosened lint, and returning said seed to said circuitous paths for further abrasive treatment alternating with further air treatment.

3. Method of delinting cotton seed comprising providing in a region intermediate the induction and eduction ends of a moving air column, an abrupt direction change in said air column, moving raw cotton seed repetitively through a succession of circuitous closed paths extending transversely of the direction of air flow and communicating therewith in the region of said direction change, subjecting the seed to abrasive action while within said closed paths for loosening lint, throwing them, in the course of each circuit through a path which carries them into and out of the salient portion of said air column at said region of direction change for removing and carrying off loosened lint in said air column, returning said seed to said circuitous paths for further abrasive treatment, and varying the obliquity of said circuitous paths so as to control the return of advance of the seed from one end to the other of said paths.

4. Method of delinting cotton seed comprising providing in a region intermediate the induction and eduction ends of a drawn air column, an abrupt direction change in said air column, moving raw cotton seed repetitively through a succession of circuitous closed paths extending transversely of the direction of the air flow in said column and communicating therewith in the region of said direction change, subjecting said seed to abrasive action with the walls defining said closed paths for loosening lint, causing the seed at intervals in their circuitous movement to perform vorticular movements in which they rub against one another, throwing them, in the course of each circuit, through a path which carries them into and out of the salient portion of said air column at said region of direction change for removing and carrying off loosened lint, and returning said seed to said circuitous paths for further abrasive treatment alternating with further air treatment.

ORLANDO SHEPPARD, Jr.